H. PAULING.
PROCESS OF MANUFACTURING NITRITES AND NITRATES.
APPLICATION FILED APR. 9, 1910.
991,356.
Patented May 2, 1911.
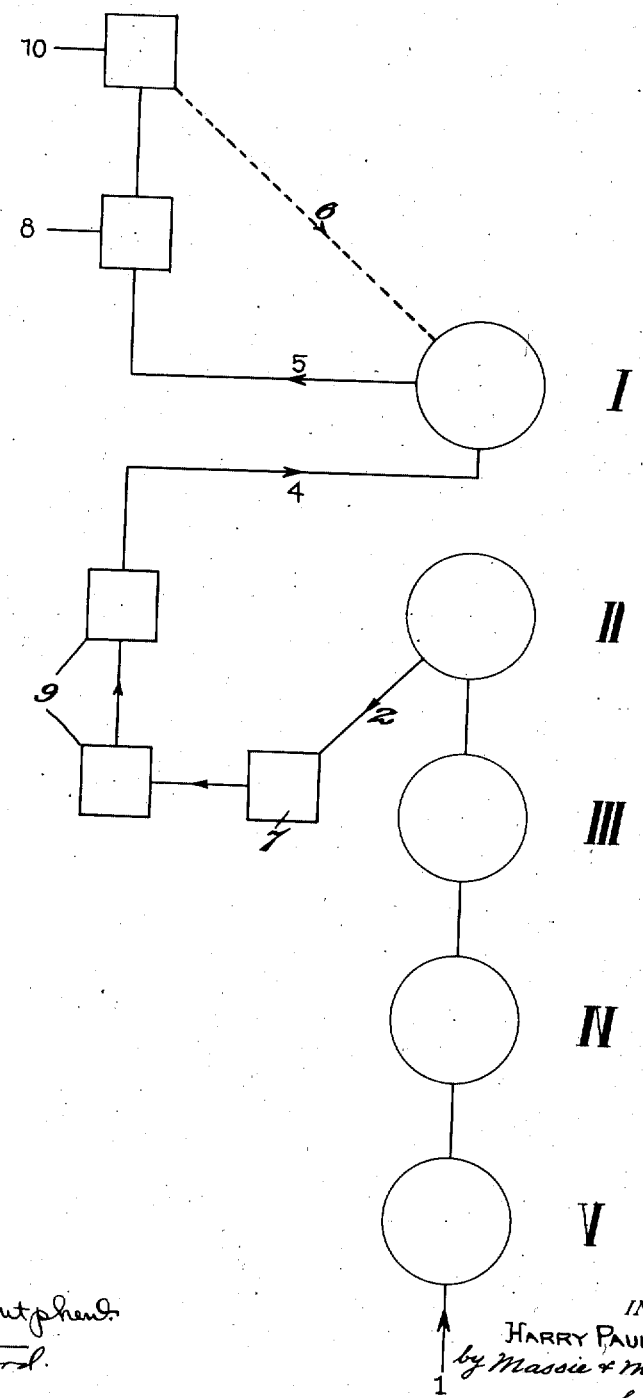
WITNESSES
INVENTOR
HARRY PAULING
by Massie & McElroy
his Attorneys

UNITED STATES PATENT OFFICE.

HARRY PAULING, OF GELSENKIRCHEN, GERMANY, ASSIGNOR TO SALPETERSÄURE INDUSTRIE-GESELLSCHAFT, G. M. B. H., OF GELSENKIRCHEN, GERMANY.

PROCESS OF MANUFACTURING NITRITES AND NITRATES.

991,356. Specification of Letters Patent. Patented May 2, 1911.

Application filed April 9, 1910. Serial No. 554,517.

*To all whom it may concern:*

Be it known that I, HARRY PAULING, subject of the King of Saxony, residing at 84 Wilhelmstrasse, Gelsenkirchen, in the Kingdom of Prussia, Empire of Germany, have invented a new and useful Improvement in Processes of Manufacturing Nitrites and Nitrates; and I do hereby declare the following to be a full, clear, and exact description of the same.

This invention relates to processes of recovering nitrates and nitrites; and it comprises a method wherein nitrous vapors, such as those produced in the oxidation of atmospheric nitrogen, are methodically treated and absorbed in such manner as to give relatively pure nitrites and nitrates, such vapors being first exposed to a solution relatively rich in nitrates and subsequently to solutions suited to form nitrites, such solutions being finally treated to recover nitrites and form a mother liquor rich in nitrates, such mother liquor being utilized for the first treatment of the nitrous gases; all as more fully hereinafter set forth and as claimed.

In the absorption of nitrous gases, such as for example are produced by the oxidation of atmospheric nitrogen, by solutions of alkalis and alkaline earths, by carbonates, etc., it is well known that where such gases are not too concentrated, a mixture of nitrates and nitrites is produced, the proportion of nitrites increasing with the dilution of the gases. This absorption by alkalis is often utilized in the arts, sodium carbonate being the absorbent generally used. With sodium carbonate the valuable salt sodium nitrite may be easily produced, but in practice it is difficult to separate this nitrite from the less valuable sodium nitrate formed at the same time. The nitrite and nitrate are of approximately the same solubility in water and other solvents, whether hot or cold, so that by evaporation and concentration, or by limited solution, only the excess of one salt or the other can be obtained in a comparatively pure state. With a mixture of 80 parts nitrite and 20 parts nitrate, only 60 parts at most of nitrite can be easily obtained in an isolated state, the remaining 20 parts of nitrite remaining admixed with the 20 parts of nitrate. This mixture is of comparatively small value as compared with either of its components in a pure state; and particularly with nitrite.

In the absorption it is usual to employ the countercurrent principle, the nitrous gases being passed successively through a series of towers while the absorbent liquid or lye flows through the series in the other direction. In this manner of operation obviously the gas mixture which has gone through several absorption towers and contains but little oxidized nitrogen comes into contact with the freshest and strongest lye, while the nearly saturated lye or solution comes into contact with fresh gases. The proportion of sodium carbonate in the lye decreases as it passes onward until in the last tower (the first as regards gas) the carbonate is practically all eliminated and the solution becomes one of nitrate and nitrite. Nitric acid vapors are absorbed at all points by the lye.

It is the object of the present invention to conduct the operation in a more methodical manner. For this purpose, absorption is conducted in a series of towers. These towers are all traversed by the gases to be treated, such gases passing from one to another in the usual manner. The absorbent liquid does not however flow directly through the whole series as in the ordinary practice. Instead, the first tower in series (as regards gases) is supplied with a special absorbent liquid while the soda solution or other absorbent liquid is transmitted through the remaining towers in a direction opposed to the flow of gases but is intercepted at the base of the second tower in series (as regards gases). This absorbent lye is removed at this point with the carbon dioxid of the original carbonate mainly or wholly replaced by nitrogen acids, and is mainly or wholly a solution of nitrate and nitrite. This solution is evaporated and crystallized to obtain sodium nitrite and a mother liquor containing both nitrate and nitrite in approximately equal amounts. This mother liquid is used as the absorbent liquid in the first tower in series (as regards gas). The fresh nitrous gases coming into contact with it decompose any residual carbonate. In this tower the nitric acid is mainly absorbed and with its absorption nitrite is decomposed, forming nitrous gases which join the current of gases under treatment, becoming so extensively and rapidly diluted thereby that further oxidation does not take place to any extent, and the gases leaving the tower are adapted to produce mainly nitrite by the further absorption treatment with alkali. When the liquor in the first tower in series becomes acid and is no longer capable of absorbing, it is spent and contains mainly or wholly nitrate, which can be separated by evaporation and crystallization, the residual mother liquor being returned to the tower. Operating in this manner, the percentage of nitrite produced in the second and subsequent towers is much higher than usual.

The accompanying drawing shows diagrammatically an arrangement of apparatus elements suitable for carrying out the process of the present invention, the course of the liquid through the various towers and vats being indicated by direction arrows.

The alkaline liquid, for example a 20 per cent. sodium carbonate solution, flows through towers V, IV, III, and II, meeting and absorbing nitrous gases flowing in the opposite direction. The liquor issuing from tower II and containing dissolved matter of which, say, about 85 per cent. is nitrite and about 15 per cent. is nitrate, passes as indicated by 2 into an evaporating apparatus 7 for concentration. The concentrated liquor is led into crystallizing tanks 9 where sodium nitrite crystallizes out, leaving a residual mother liquor containing about equal parts of sodium nitrite and sodium nitrate in solution, together with a small amount of sodium carbonate. This mother liquor is then conducted as at 4 to tower I where it meets the fresh nitrous gases from which it absorbs substantially all the nitric acid. In this absorption the sodium carbonate remaining in the mother liquor is decomposed and the sodium nitrite is changed to nitrate with evolution of nitrous gases. These evolved nitrous gases are so diluted by the large volume of unabsorbed gases passing through and leaving tower I, that there is practically no opportunity for them to become oxidized; and consequently the quantity of nitrates formed in the succeeding towers is much less than usual.

The liquor 5 leaving tower I is free of nitrite and contains practically only nitrate. It may be concentrated in evaporator 8, and pure nitrate may be crystallized out at 10, the residual mother lye being returned if desired to tower I as by pipe 6, shown dotted. The specific proportions given in the foregoing example vary of course with varying conditions of operation.

To summarize briefly: In the ordinary method of operation a series of consecutively placed towers are employed. In these the gases are washed by an alkali solution on the countercurrent principle, the operation being so controlled that at the first tower (as regards the gases) the alkali solution is neutralized as nearly as possible, leaving as a solution of nitrate and nitrite containing little residual carbonate. In the present operation the same thing is done, but in lieu of taking the fresh gases directly into the first of these towers, such gases are given a preliminary treatment in a special tower supplied with a special solution, such solution being a substantially neutral solution of nitrite and nitrate. In this solution in lieu of the acid gases decomposing merely residual carbonate, as in the ordinary practice, the nitric acid decomposes nitrite, yielding nitrate and evolving nitrous vapors which pass forward with the residual nitrous vapors into the first tower of the regular series where absorption by carbonate solution is effected, with the production of a solution high in nitrites.

What I claim is:—

1. The process of manufacturing nitrate and nitrite, which comprises absorbing nitrous gases in lye, separating nitrite from said lye, causing fresh nitrous gases to act on the residual lye, and separating the nitrate produced thereby.

2. The process of manufacturing nitrate and nitrite which comprises absorbing nitrous gases in lye, separating nitrite from said lye by evaporation and crystallization, causing fresh nitrous gases to act on the residual lye, and separating the nitrate produced thereby.

3. The process of manufacturing nitrate and nitrite which comprises absorbing nitrous gases in lye, separating nitrite from said lye, causing fresh nitrous gases to act successively on the residual lye and on a fresh body of lye, and separating the nitrate produced thereby in said residual lye.

4. The process of manufacturing nitrate and nitrite which comprises passing nitrous gases through a series of towers, passing lye in the opposite direction through part of said series, separating nitrite from the lye which has traversed this part of said series, passing the residual lye through the remainder of said series, and separating nitrate from said residual lye after the passage of the latter through the remainder of said series.

5. In the manufacture of nitrite and nitrate, the process which comprises treating gases containing nitrogen oxids with a substantially neutral solution containing nitrite and a nitrate, and then treating the unabsorbed and the evolved gases with an alkaline solution.

6. In the manufacture of nitrite and nitrate, the process which comprises passing an alkaline liquid against a counter-current of preliminarily treated nitrous gases until said liquid is nearly neutral, separating nitrite from the resulting liquid, and preliminarily treating nitrous gases with the mother liquor from the nitrite separation.

7. In the manufacture of nitrite and nitrate, the process which comprises passing a solution of sodium carbonate against a counter-current of nitrous gases to obtain a liquor containing nitrite and nitrate, withdrawing such liquor from the said current of gases and separating out part of said nitrite, and treating fresh nitrous gases with the resulting mother liquor to absorb nitric acid.

8. In the manufacture of nitrite and nitrate, the process which comprises passing gases containing nitrogen oxids through a tower supplied with a substantially neutral solution of nitrite and nitrate, and then passing the unabsorbed and the evolved gases through towers fed with an alkaline solution.

In testimony whereof, I have signed my name to this specification in the presence of two subscribing witnesses.

HARRY PAULING.

Witnesses:
ABRAHAM SCHLESINGER,
LOUIS MUELLER.